(12) United States Patent
Streeter et al.

(10) Patent No.: US 8,321,905 B1
(45) Date of Patent: Nov. 27, 2012

(54) FAST SWITCHING OF MEDIA STREAMS

(75) Inventors: Kevin Streeter, San Francisco, CA (US); Stephen Cheng, Foster City, CA (US); Abhinav Kapoor, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 440 days.

(21) Appl. No.: 12/572,962

(22) Filed: Oct. 2, 2009

(51) Int. Cl.
*H04N 7/173* (2011.01)
*G06F 15/16* (2006.01)

(52) U.S. Cl. ............ 725/134; 725/89; 725/92; 725/115; 709/231

(58) Field of Classification Search .................. None
See application file for complete search history.

(56) References Cited

U.S. PATENT DOCUMENTS

| | | | |
|---|---|---|---|
| 6,938,047 B2 | 8/2005 | Kryeziu | |
| 7,400,764 B2 | 7/2008 | Kryeziu | |
| 7,496,676 B2 | 2/2009 | Kryeziu | |
| 7,818,444 B2 | 10/2010 | Brueck et al. | |
| 7,873,760 B2 * | 1/2011 | Versteeg | 710/52 |
| 2002/0133247 A1 * | 9/2002 | Smith et al. | 700/94 |
| 2007/0079327 A1 | 4/2007 | Khoo et al. | |
| 2007/0156679 A1 | 7/2007 | Kretz et al. | |
| 2007/0192812 A1 * | 8/2007 | Pickens et al. | 725/94 |
| 2007/0220552 A1 | 9/2007 | Juster et al. | |
| 2007/0226365 A1 | 9/2007 | Hildreth et al. | |
| 2007/0282905 A1 | 12/2007 | Karlberg | |
| 2008/0310825 A1 | 12/2008 | Fang et al. | |
| 2009/0063975 A1 | 3/2009 | Bull et al. | |
| 2009/0094248 A1 | 4/2009 | Petersen | |
| 2009/0099919 A1 | 4/2009 | Schultheiss et al. | |
| 2009/0307367 A1 * | 12/2009 | Gigliotti | 709/231 |
| 2010/0057928 A1 | 3/2010 | Kapoor et al. | |
| 2011/0066673 A1 | 3/2011 | Outlaw | |

OTHER PUBLICATIONS

Bill Birney, "Intelligent Streaming," Microsoft Corporation, May 2003, retrieved from internet on Mar. 4, 2010: http://www.microsoft.com/windows/windowsmedia/howto/articles/intstreaming.aspx?pf=true.
"Our Clients," Move Networks, Inc., 2004-2010, retrieved from internet, 1 page.
Office Action in U.S. Appl. No. 12/201,952 mailed Apr. 30, 2010, 10 pages.
Office Action in U.S. Appl. No. 12/559,029 mailed Mar. 1, 2011, 11 pages.

(Continued)

*Primary Examiner* — Chris Parry
(74) *Attorney, Agent, or Firm* — Fish & Richardson P.C.

(57) ABSTRACT

Methods, systems, and apparatus, including computer programs encoded on a computer storage medium, for fast switching of media streams, are described. The methods and systems described in this specification enable switching media streams as quickly as possible without playback interruption by not having to playback the content of the full buffer prior to the switch to the new stream. The fast switching disclosed in this specification is based on configuring a media player operated at a client computer to specify a switching time offset that corresponds to buffered content. In addition, the disclosed methods and systems enable a media streaming server computer, that is streaming a first media stream to the client computer, to select a key frame of a second media stream that is at or near a switching time offset specified by the client computer, and to immediately begin transmission of the second media stream.

17 Claims, 5 Drawing Sheets

OTHER PUBLICATIONS

SWF File Format Specification, Version 10, Adobe Systems Incorporated, Nov. 2008 (http://www.adobe.com/devnet/swf/pdf/swf_file_format_spec_v10.pdf).

"Move Networks Solutions," Move Networks, Inc., retrieved from internet on Aug. 29, 2008: http://www.movenetworks.com/why-move/solutions, 4 pages.

"Move Media Player," Move Networks, Inc., retrieved from internet on Aug. 29, 2008: http://www.movenetworks.com/wp-content/uploads/move-media-player.pdf, 3 pages.

"Move Adaptive Stream," Move Networks, Inc., retrieved from internet on Aug. 29, 2008: http://www.movenetworks.com/wp-content/uploads/move-adaptive-strem.pdf, 4 pages.

"Our Clients," Move Networks, Inc., retrieved from internet on Aug. 29, 2008: http://www.movenetworks.com/why-move/our-clients, 3 pages.

Office Action in U.S. Appl. No. 12/559,029 mailed Aug. 19, 2011, 8 pages.

* cited by examiner

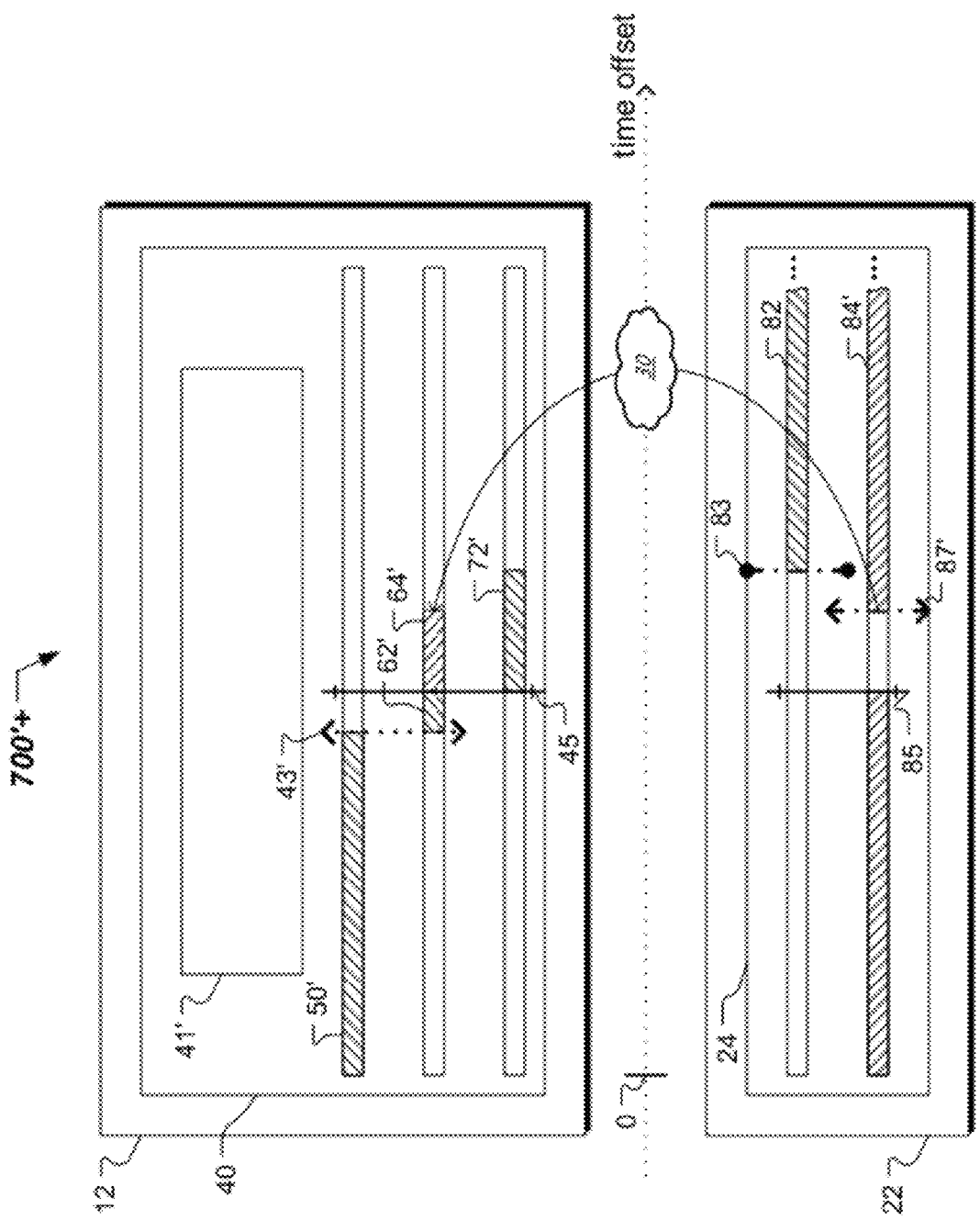

FAST SWITCHING OF MEDIA STREAMS

BACKGROUND

This specification relates to fast switching of media streams.

In some instances, a media playing computer cannot render video without dropping frames because, for example, of a decrease in available central processing unit (CPU)-resources. A video encoded at a lower bit-rate can be requested by the media playing computer to avoid dropping video frames while the available CPU-resources are low. However, the media playing computer may have to play the full buffer before the lower quality video can be received and played. In other instances, a media player may play a low quality video in windowed mode. When switching from windowed mode playback to playback in full-screen mode, the media player can request a video having a larger frame size and being encoded at a larger bit-rate. Once again, the newly requested higher quality video can be seen by a user of the media player only after the media player plays out the entire duration of the buffer which stores the video encoded at the lower bit-rate corresponding to the low-resolution windowed mode.

Both situations described above can lead to non-smooth, less then desirable viewing experiences that can last for the duration of the buffer. The duration of the buffered content can be, for some media players, on the order of one minute or more. To avoid prolonged disruptive viewing experiences as described above, other media players operate with short video buffers, having time durations on the order of a few seconds. However, media players that operate with such short video buffers can experience buffer under-runs leading to non-smooth viewing experiences.

SUMMARY

This specification describes technologies relating to fast switching media streams. The methods and systems described in this specification enable switching media streams as quickly as possible without playback interruption by not having to playback the content of the full buffer prior to the switch to the new stream. The fast switching disclosed in this specification is based on configuring a media player operated at a client computer to specify a switching time offset that corresponds to buffered content.

One aspect of the subject matter described in this specification can be implemented in methods performed by a client computer that communicates with a media streaming server. The methods include receiving a first media stream. The first media stream can be stored in a buffer. The first media stream can be played from the buffer. Further, the methods include requesting a switch from the first media stream to a second media stream at a specified switching time offset of the first media stream. The switching time offset corresponds to buffered content of the first media stream. The buffered content can be stored in the buffer at a time of the requesting the switch. In addition, the methods include receiving the requested second media stream. The initially received content of the second media stream corresponds to the buffered content. The methods also include playing the second media stream. Other implementations of this aspect include corresponding systems, apparatus, and computer programs, configured to perform the actions of the methods, encoded on computer storage devices.

These and other implementations can include one or more of the following features. Receiving the requested second media stream can occur before the buffered content of the first media stream is fully played. In such instances, the method includes replacing, in the buffer, a portion of the first media stream following the buffered content with the received second media stream. If the first and second media streams are video streams, the switching between the first and second media streams can occur at a key frame of the second media stream located at or near the specified switching time offset. Otherwise, switching between the first and second media streams can occur at the specified switching time offset.

Further, receiving the requested second media stream can occur after the buffered content of the first media stream is played beyond the specified switching time offset. In such other instances, the method includes identifying a time offset corresponding to buffered content of the first media stream that is in the buffer upon receipt of the second media stream. Further, the method replaces, in the buffer, a portion the first media stream following the identified time offset with a portion of the received second media stream following the identified time offset. If the first and second media streams are video streams, the identifying of a time offset corresponding to a key frame of the second media stream that is after a playback time offset of the first media stream. The playback time offset corresponds to the currently playing play head in the first media stream. Further, the method can associate the time offset with the selected key frame.

Furthermore, the method can request to switch from the first media stream to a second media stream in response to detecting a change in client's playback bandwidth. The client's playback bandwidth can include computing (e.g., CPU) resources that are available to a media player of the client computer for rendering media of a given bit-rate and resolution. The client's playback bandwidth can also include a transmission bandwidth of a communication channel between the media streaming server computer and the client computer. If the detected change is a decrease in the client's playback bandwidth, the method can request to switch from the first media stream encoded at a first bit-rate to the second media stream encoded at a second bit-rate smaller than the first bit-rate. If the detected change is an increase in a client's playback bandwidth, the method can request the switch from the first media stream encoded at a first bit-rate to the second media stream encoded at a second bit-rate larger than the first bit-rate.

In addition, the first and second media streams may be video streams encoded at different bit-rates. In one instance, responsive to detecting video frame drops while playing the first video stream encoded at a first bit-rate, the method can request to switch from the first video stream to the second video stream encoded at a second bit-rate smaller than the first bit-rate.

Also, responsive to switching from windowed play to full screen play of the first video stream encoded at a first bit-rate, the method can request to switch from the first video stream to the second video stream encoded at a second bit-rate larger than the first bit-rate.

Additionally, the switching time offset can be specified in various ways. For instance, in some implementations, the method can specify the switching time offset as a playback time offset of the first media stream plus a selected time interval. The time interval can be selected to be a predetermined fraction of a time offset range of the buffer. In some cases, the time interval can be selected to be a fraction of a time offset range of the buffer. The fraction can be determined based at least in part on (i) a change magnitude and a change sign of a client's playback bandwidth, and (ii) a magnitude of the client's playback bandwidth.

According to another aspect, a method can be implemented at a media streaming server computer. The media streaming server computer is configured to stream a first media stream to a client computer. The media streaming server computer is also configured to hold a second media stream having common time offsets with the first media stream. Corresponding first and second contents of the first and second media streams, respectively, correspond to a common time offset. While streaming to the client computer current content of the first media stream corresponding to a current time offset, the media streaming server can receive from the client computer a request for a switch from the first media stream to the second media stream at an earlier time offset specified by the client computer. The earlier time offset corresponds to previously streamed content of the first media stream. The media streaming server computer is configured to stream to the client computer the requested second media stream, such that the initially streamed content of the second media stream corresponds to the previously streamed content of the first media stream.

The media streaming server is further configured to switch between the first and second media streams at a key frame of the second media stream following the earlier time offset specified by the client computer. The corresponding first and second contents of the first and second media streams, respectively, can be identical media contents encoded at a first bit-rate and a second bit-rate, respectively. The corresponding first and second contents of the first and second media streams, respectively, can be different aspects of related media. For example, the corresponding first and second contents of the first and second media streams, respectively, may be first view and second view videos, respectively. The media streaming server computer can be configured to obtain the first and second media streams during a recording of a live event. Further, the obtained first and second media streams can be stored in memory prior to streaming. To store the first and second media streams in memory, the media streaming server computer can be configured to generate a media streaming document including the first and second media streams. The format of the media streaming document can be one of Moving Picture Experts Group (MPEG)-1 audio layer 3 (MP3), Flash Video (FLV and F4V), and RAW, for example.

Particular implementations of the subject matter described in this specification can be implemented so as to realize one or more of the following potential advantages. The methods and systems disclosed in this specification can enable a media player operated at the client computer to use large size buffers to avoid buffer run-out situations. However, upon receiving an instruction to switch between the currently played media stream and another media stream, the methods disclosed here can enable the media player to specify a switching time offset within the client's buffer. Thus, the media player does not playback the entire large size buffer prior to switching. Fast switching methods as disclosed here can provide for a smooth viewing experience at the media player of the client computer.

The methods described in this specification also enable a media streaming server computer to respond rapidly to a switching request received from a client computer, without having to complete a current transmission of a currently streamed first media stream (to an upcoming key frame). The foregoing advantage is due to the fact that a switching time offset specified by the client can refer to content that has been already streamed to the client computer and that is common between the first media stream and a second media stream (to switch to). Thus, the media streaming server computer can select a key frame of the second media stream that is at or near the specified switching time offset and immediately begin transmission of the second media stream.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A, 2B and 2C are block diagrams that show aspects of the system and method for fast switching between the first and second media streams.

Like reference numbers and designations in the various drawings indicate like elements.

DETAILED DESCRIPTION

The methods and systems disclosed in this specification enable fast switching of media streams. These methods can be implemented in media player software, or an execution environment that provides services to programs that play media content, for potentially improved multimedia rendering. The methods described in this specification can also be implemented in other programs and software, such as server software for multimedia streaming.

Figure 1:
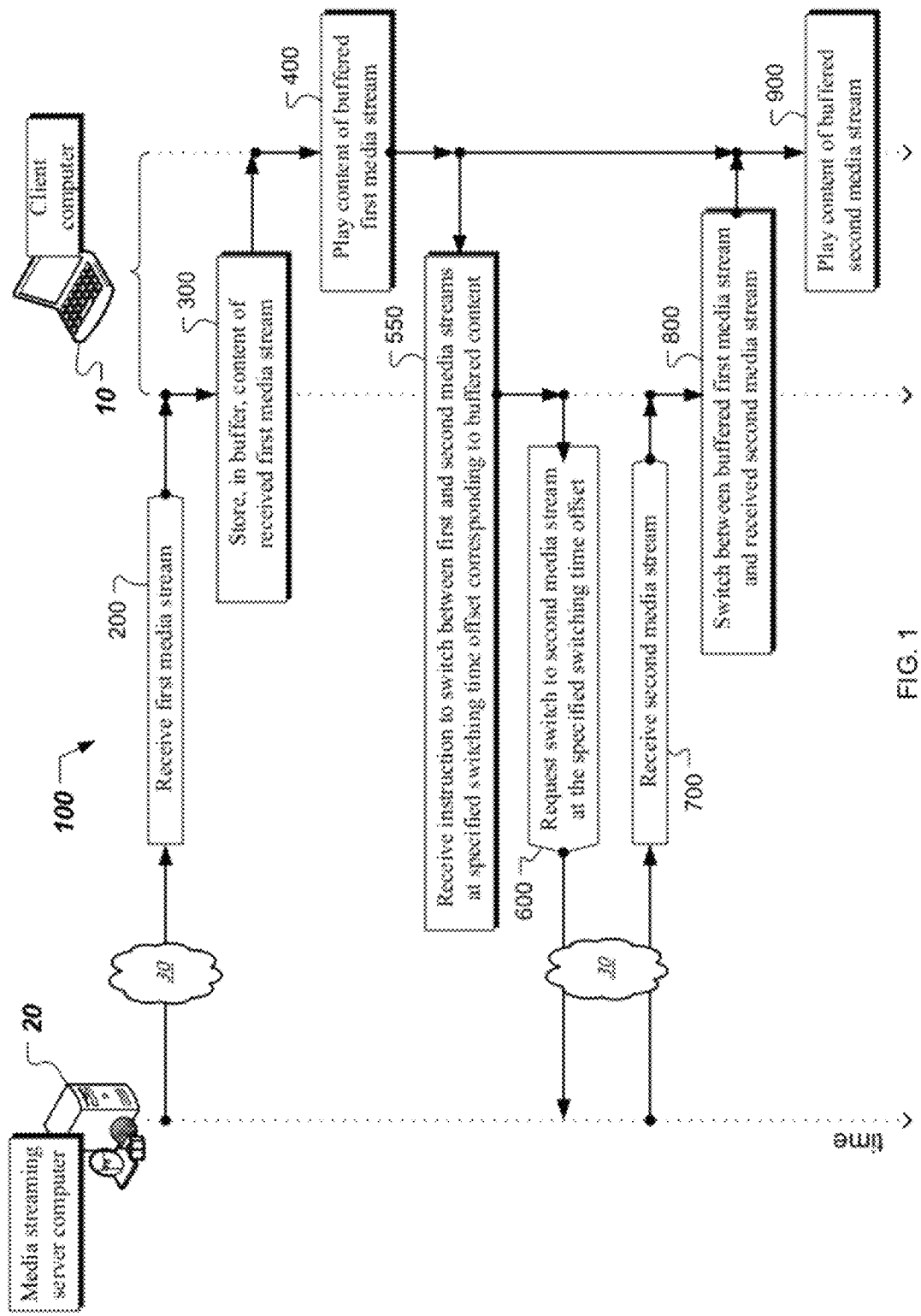
FIG. 1 is a block diagram that shows an example system and method for fast switching between first and second media streams.

FIG. 1 is a block diagram that shows an example system and method for fast switching between first and second media streams. A communication system 100 includes a client computer 10 communicatively coupled to a media streaming server computer 20 via a communication channel 30. In some implementations, the communication channel 30 may be implemented via the Internet. In other implementations, the communication channel 30 may be implemented via a private communication network. Examples of communication protocols that can be implemented over the communication channel 30 are transmission control protocol (TCP), real-time transport protocol (RTP), real-time messaging protocol (RTMP), real-time transport control protocol (RTCP), and real-time media flow protocol (RTMFP) over user datagram protocol (UDP).

The client computer 10 necessarily includes some hardware since the client computer 10 includes a computerized electronic device. The computerized electronic device may be a laptop computer, a media player device, a mobile device, etc. The client computer 10 includes a processor and may also include a storage device. The processor can be configured to request and receive a media stream from the media streaming server computer 20. Further, the client computer 10 includes an output device for rendering and playing the received media stream.

The media streaming server computer 20 necessarily includes some hardware since the media streaming server computer 20 can include at least a computer workstation. Further, the media streaming server computer 20 can include or can be communicatively coupled to media storage device. The media storage device can store a plurality of media streaming documents. A media streaming document may, but need not, correspond to a file. A media streaming document may be stored in a portion of a file that holds other documents, in a single file dedicated to the media streaming document in question, or in multiple coordinated files. The media streaming server computer 20 is configured to access the stored plurality of media streaming documents. In addition, the media streaming server computer 20 is configured to process the accessed media streaming documents, and to generate media streams, and to stream the generated media streams to the client computer 10. A media stream can include a collection of video, audio and data packets that are being streamed from the media streaming server computer 20 to the client computer 10 via the communication channel 30.

A video stream can include a key frame every specific length of time with a series of intermediate frames that define all of the changes to a scene from one key frame to the next. The next key frame can represent the scene as it evolved from the previous key frame to include all of the changes from the interim intermediate frames. Subsequent intermediate frames would begin representing the changes to the scene after the next key frame. This process continues until the end of the media stream.

An example of a method to accomplish fast switching between media streams received by the client computer 10 is now described in connection with FIG. 1. The client computer 10 can receive 200, from the media streaming server computer 20 via the communication channel 30, a first media stream. The contents of the received first media stream can be stored 300 in a buffer of client computer 10. In some implementations, the buffer can be a hardware buffer. In other implementations, the buffer can be a software buffer that employs general purpose hardware of the computer, for example, the buffer of a media player application. A media player of the client computer 10 can play 400 the buffered content of the first media stream.

While playing 400 the buffered content of the first media stream, the media player of client computer 10 can receive 550 an instruction to switch between the first media stream and a second media stream at a specified time offset corresponding to buffered content of the first media stream. By specifying the switching time offset to correspond to content that is stored in the buffer at the time when the switching instruction is received, the method described in FIG. 1 enables system 100 to provide fast switching between the first and second media streams. In contrast to the switching method implemented in system 100, other methods of switching between first and second media streams may specify a switching time offset corresponding to the end of the buffered content. Therefore, the other switching methods may provide the second media stream at the client computer 10 (as part of a subsequent transmission from the media streaming server computer 20) beginning at a time offset that comes after the buffered content, thus requiring play-back of the entire buffered content of the first stream. Accordingly, the switching method implemented in system 100 (for which the switching time offset corresponds to buffered content of the first media stream) necessarily is faster than the other switching methods.

In some implementations, the switching instruction can be generated automatically, by a module of the media player, in response to the client computer 10 detecting changes in playback bandwidth. If the detected change is a decrease in the client's playback bandwidth, the media player of the client computer 10 can be configured to request a switch from the first media stream encoded at a first bit-rate to the second media stream encoded at a second bit-rate smaller than the first bit-rate. A degradation of the client's playback bandwidth can occur, for example, when computing resources of the client computer 10 are diverted away from the media player, or when the transmission rate of the communication channel 30 decreases. However, if the detected change is an increase in the client's playback bandwidth, the media player of the client computer 10 can be configured to request a switch from the first media stream encoded at a first bit-rate to the second media stream encoded at a second bit-rate larger than the first bit-rate. An improvement in the client's playback bandwidth can occur, for example, when computing resources of the client computer 10 become available to the media player, or when the transmission rate of the communication channel 30 increases.

In some cases, the media player of client computer 10 may drop video frames while playing a first video stream encoded at a first bit-rate. The frame drop can occur because the client computer lacks the power to decode the first video, or because the client computer is processing other applications at the same time as it is playing the first video, or for any other reason the client does not have the computing resources to properly play the first video stream. In such instances, an instruction can be automatically generated by a module of the media player to switch from the first video stream encoded at a first bit-rate to a second video stream encoded at a second bit-rate smaller than the first bit-rate. In other cases, the media player on the client computer 10 may switch from windowed playback of a first video stream encoded at a first bit-rate to full screen playback. In such instances, an instruction can be automatically generated by a module of the media player to switch from the first video stream encoded at a first bit-rate to a second video stream encoded at a second bit-rate larger than the first bit-rate.

In some implementations, the switching instruction can be provided by a consumer viewing the playback of the first media stream. For example, the consumer may view a first video stream including audio commentary and related video taken from a first camera angle. The consumer may choose to instruct the media player to request a switch to a second video stream including the same audio commentary and related video taken from a second camera angle. In this example, the encoding bit-rate of the first and second video streams can be the same, but the two video streams may be related to different aspects of the media.

More details about specifying the switching time offset to correspond to buffered content of the first media stream are disclosed below in connection with FIG. 3.

The method implemented in system 100 continues with the client computer 10 requesting 600, from the media streaming server computer 20, a switch between the first media stream and the second media stream at the specified switching time offset. As disclosed above, the specified switching time offset corresponds to the buffered first media stream. More details about the switching request 600 by the client computer 10 to the media streaming server computer 20, and the response of the later to the switching request 600 are presented below in connection with FIG. 2A.

In addition, the method implemented in system 100 includes receiving 700 the requested second media stream. The initially received content of the second media stream corresponds to the buffered content. In some instances, receiving 700 the requested second media stream can occur before the buffered content of the first media stream is fully played. In such instances, the client computer 10 switches 800 a portion of the buffered first media stream following the specified time offset with the received second media stream. More details about the actions performed in such instances by the client computer 10 are disclosed below in connection with FIG. 2B.

In other instances, receiving 700 the requested second media stream can occur after the buffered content of the first media stream is played beyond the specified switching time offset. In such other instances, the client computer 10 can identify a time offset corresponding to buffered content of the first media stream that is in the buffer upon receipt of the second media stream. Further, the client computer 10 switches 800 a portion the buffered first media stream following the identified time offset with a portion of the received second media stream following the identified time offset. More details about the actions performed in such other instances by the client computer 10 are disclosed below in connection with FIG. 2C.

Finally, the method implemented in system 100 continues with the media player on client computer 10 playing 900 the buffered second media stream.

Figure 2A:
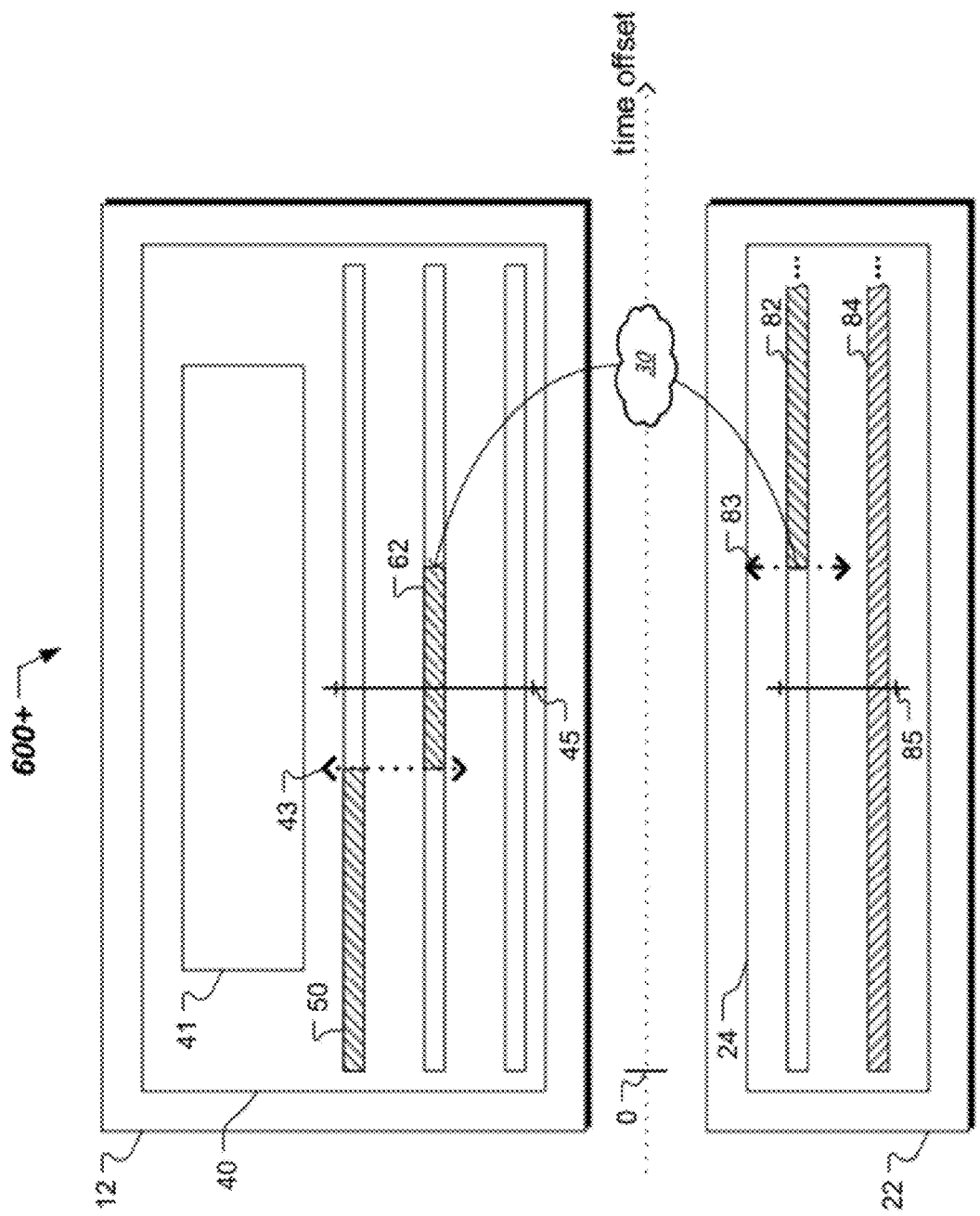
Figure 2C:
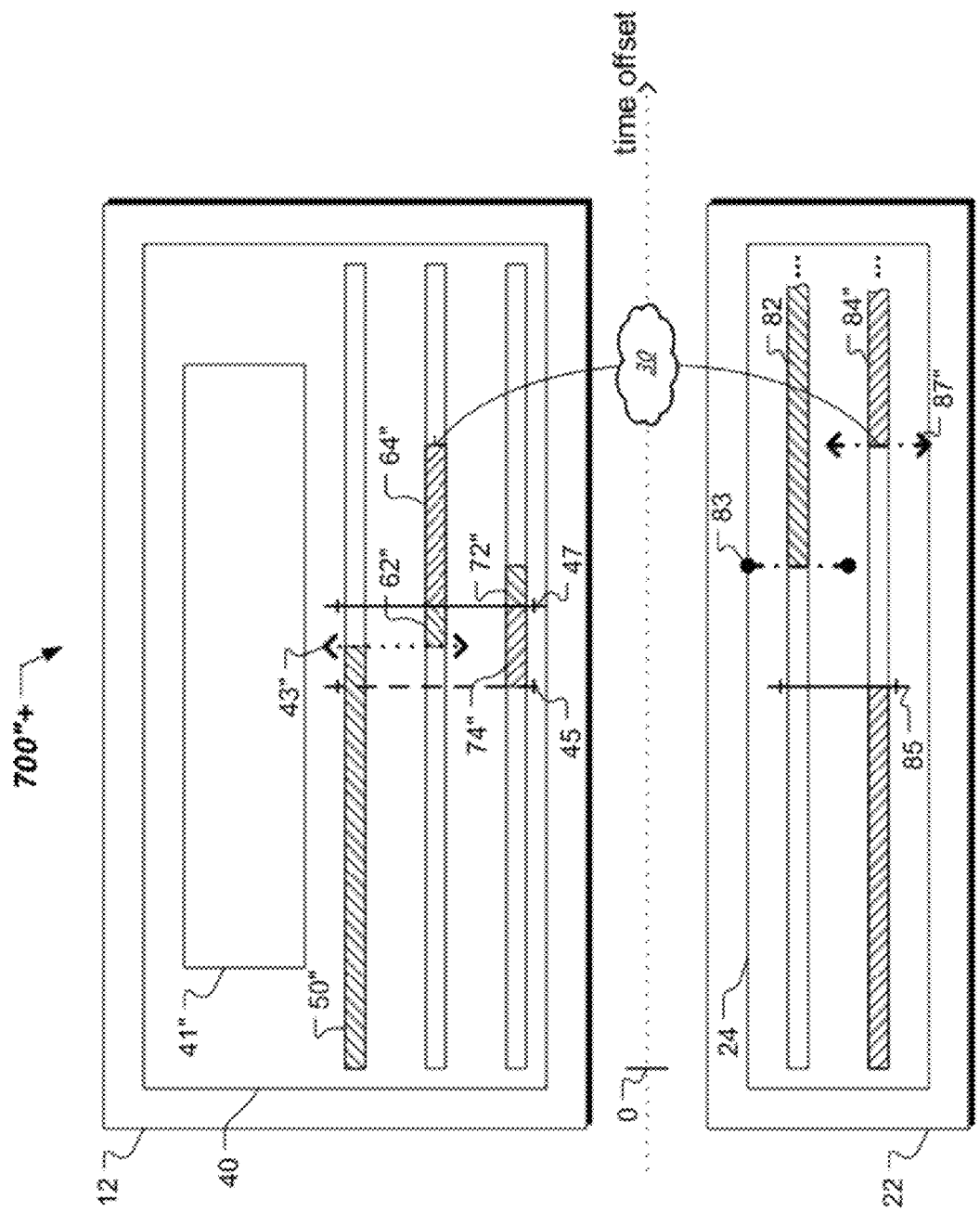

FIGS. 2A, 2B and 2C are block diagrams that show aspects of a system and method for fast switching between first and second media streams. The system illustrated schematically in FIGS. 2A, 2B and 2C can correspond to system 100 described in FIG. 1. For example, the representations of client computer 12 and of media streaming server computer 22 in FIGS. 2A, 2B and 2C can correspond, respectively, to client computer 10 and media streaming server computer 20 of system 100 described in FIG. 1.

The client computer 12 includes a media player 40 for rendering and playing a media stream received from the media streaming server computer 22. The content publishing window 41 displays to a user of client computer 12 the contents of the media stream during playback.

The media streaming server computer 22 can be configured to obtain a first media stream 82 and a second media stream 84 during a recording of a live event. Further, the obtained first and second media streams 82, 84 can be stored in memory 24 prior to streaming to the client computer 12. In some implementations, the memory 24 can be random-access memory (RAM). In other implementations, the memory 24 can also be permanent memory, e.g., a media storage device. To store the first and second media streams 82, 84 on a storage device 24, the media streaming server computer 22 can be configured to generate a media streaming document including the first and second media streams 82, 84. The format of the generated media streaming document can be one of Moving Picture Experts Group (MPEG)-1 audio layer 3 (MP3) and MPEG-4, Flash Video (FLV and F4V), and RAW, for example.

The first media stream 82 is represented diagrammatically by a forward-slash band, and the second media stream 84 is represented diagrammatically by a reverse-slash band. Moreover, corresponding first and second contents of the first media stream 82 and of the second media stream 84, respectively, correspond to a common time offset. A common time offset axis is represented in FIGS. 2A, 2B and 2C by a dotted line, and the origin of the common time offset axis, or $T_{offset}=0$, represents the common starting time offset of the first and second media streams 82, 84.

In some implementations, the corresponding first and second contents of the first media stream 82 and of the second media stream 84, respectively, can be identical video scenes encoded at a first bit-rate and a second bit-rate, respectively. In some implementations, the corresponding first and second contents of the first media stream 82 and of the second media stream 84, respectively, can be different aspects of related media. For example, the corresponding first and second contents of the first media stream 82 and of the second media stream 84, respectively, may be first view and second view videos, respectively, corresponding to a common audio commentary. In some implementations, the corresponding first and second contents of the first media stream 82 and of the second media stream 84, respectively, may be first audio commentary in English and second audio commentary in Spanish, respectively, corresponding to a common video recording of a baseball game, for example. In addition, the first and second media streams 82, 84 can include distinct media contents of two different channels, respectively, that may have neither video nor audio in common, for example.

FIG. 2A shows a snapshot in time 600+ of a system for fast switching between first and second media streams 82, 84. Referring to the method implemented in example system 100, the snap shot in time 600+ may correspond to a time immediately succeeding the request 600 the switch to the second media stream at the switching time offset.

At snap shot in time 600+, the media player 40 of client computer 12 is playing the first media stream. The playback time offset 43 is represented by a vertical dotted-line ending in arrows. The playback time offset 43 corresponds to the currently playing play head in the first media stream. The content publishing window 41 displays to a user of client computer 12 the contents of the first media stream corresponding to the playback time offset 43. The portion of the first media stream 50 that has been already played by media player 40 is represented diagrammatically by a forward-slash band preceding the playback time offset 43. The portion of the first media stream 62 that has been received by client computer 10 and has been buffered (but not yet played) by the media player 40 is represented diagrammatically by a forward-slash band succeeding the playback time offset 43.

Also at snap shot in time 600+, the media streaming server computer 22 is streaming the first media stream 82 to the client computer 12 via the communication channel 30. The streaming time offset 83 is represented by a vertical dash-dotted-line ending in arrows. The portion of the first media stream 82 that remains to be streamed by media streaming server computer 22 to the client computer 12 is represented diagrammatically by a forward-slash band succeeding the streaming time offset 83. The streaming of the first media stream 82 by the media streaming server computer 22 to the client computer 12 is represented diagrammatically by the arrowed-curve starting at the streaming time offset 83 of the first media stream 82, and ending at the back of the buffered content 62 stored by the media player 40 at client computer 12. The portion of the first media stream 50 that has been already played by media player 40 plus the portion of the media stream 62 that has been buffered by the media player 40 add up to the portion of the first media stream 82, preceding the streaming time offset 83, that has been already streamed by the media streaming server computer 22 to the client computer 12. Also note that by the snap shot in time 600+, the media streaming server computer 22 has not yet streamed to the client computer 12 any portions of the second media stream 84 (that is stored in memory 24). The stored second media stream 84 is a represented diagrammatically by a reverse-slash band.

Further by snap shot in time 600+, the client computer 12 has already requested from the media streaming server computer 22 a switch between the first and second media streams 82, 84. The switching time offset 45 is specified by the media player 40 of the client computer 12 to correspond to buffered content of the first media stream 62, and is represented by a vertical line ending in horizontal bars. Moreover, the switching time offset 85 is represented, at the media streaming server computer 22, by another vertical line ending in horizontal bars. The switching time offset 85 chosen by the media streaming server computer 22 may be identical to the switching time offset 45 specified by the client computer 10 if the first and second media streams 82, 84 represent data or audio streams. However, if the first and second media streams 82, 84 represent video streams, the media streaming server computer 22 can choose a switching time offset 85 at a key frame of the second media stream 84 at or following the switching time offset 45 specified by the client computer 12.

Also note, that the switching time offset 85 is necessarily earlier than the streaming time offset 83. Therefore, the media streaming server computer 22 can stream to the client computer 12 the requested second media stream 84, such that the initially streamed content of the second media stream 84 (succeeding switching time offset 85) corresponds to currently buffered content of the first media stream 62 at the client computer 12 (succeeding switching time offset 45).

FIG. 2B shows a snapshot in time 700'+ of the system for fast switching between first and second media streams 82, 84 described in connection with FIG. 2A. Referring to the method implemented in example system 100, the snap shot in time 700'+ may correspond to a time immediately succeeding the receipt 700 of the second media stream. More specifically, FIG. 2B depicts an example when the requested second media stream is received by the client computer 12 before the buffered content of the first media stream 62' is fully played up to the specified switching time offset 45. In this example, the method includes replacing, in the buffer, a portion of the first media stream 72' following the specified time offset 45 with the received second media stream 64', as described below.

At snap shot in time 700'+, the portion of the first media stream 50' that has been already played by media player 40 is represented diagrammatically by a forward-slash band preceding the playback time offset 43'. The playback time offset 43' corresponds to the currently playing play head in the first media stream. The content publishing window 41' displays to a user of client computer 12 the contents of the first media stream corresponding to the playback time offset 43'. Note that in this example, the playback time offset 43' is before the specified switching time offset 45. A buffered portion of the first media stream 62' is represented diagrammatically by a forward-slash band succeeding the playback time offset 43', but preceding the specified switching time offset 45. Another portion of the first media stream 72' represented diagrammatically by a forward-slash band succeeding the specified switching time offset 45 is discarded by the client computer 12. The discarded portion of the first media stream 72' has been replaced in the buffer by a portion of the received second media stream 64'. The second media stream 64' that has been buffered (but not yet switched and played) by the media player 40 is represented diagrammatically by a reverse-slash band succeeding the specified switching time offset 45.

Also at snap shot in time 700'+, the media streaming server computer 22 is streaming the second media stream 84' to the client computer 12 via the communication channel 30. The streaming time offset 87' is represented by a vertical dash-dotted-line ending in arrows. The portion of the second media stream 84' preceding the switching time offset 85 (that has not been requested for streaming), and the other portion of the second media stream 84' succeeding the streaming time offset 87' (that remains to be streamed by media streaming server computer 22 to the client computer 12) are represented diagrammatically by reverse-slash bands. The streaming of the second media stream 84' by the media streaming server computer 22 to the client computer 12 is represented diagrammatically by the arrowed-curve starting at the streaming time offset 87' of the second media stream 84', and ending at the back of the buffered content 64' stored by the media player 40 at client computer 12. The portion of the second media stream 64' that has been buffered by the media player 40 fits the portion of the second media stream 84' (that has been already streamed by the media streaming server computer 22 to the client computer 12) between the switching time offset 85 and the streaming time offset 87. Also note that by the snap shot in time 700'+, no other portions of the first media stream 82 have been streamed by the media streaming server computer 22 to the client computer 12. The streaming time offset 83 at the snap shot in time 600+ immediately succeeding the switching request from the client computer 10 is now represented by a vertical dash-dotted-line ending in circles.

As noted in relation to FIG. 2A, if the first and second media streams 82, 84 are video streams, the switching between the buffered first and second media streams 62', 64' can occur at a key frame of the second media stream located at or near the specified switching time offset. Otherwise, switching between the buffered first and second media streams 62', 64' can occur at the specified switching time offset 45.

FIG. 2C shows a snapshot in time 700"+ of the system for fast switching between first and second media streams 82, 84" described in connection with FIG. 2A. Referring to the method implemented in example system 100, the snap shot in time 700"+ may also correspond to a time immediately succeeding the receipt 700 of the second media stream. However, FIG. 2C depicts an example when the requested second media stream is received by the client computer 12 after the buffered content of the first media stream 62" is played beyond the specified switching time offset 45.

In this case, the method includes identifying another switching time offset 47 corresponding to buffered content of the first media stream 62" that is in the buffer upon receipt of the second media stream 64". Further, the method replaces, in the buffer, a portion of the first media stream 72" following the identified switching time offset 47 with a portion of the received second media stream 64" following the identified switching time offset 47. If the first and second media streams 82, 84" are video streams, the identifying of the switching time offset 47 can include selecting a key frame of the portion of the second media stream 64" that is after the playback time offset 43" in the first stream. The playback time offset 43" corresponds to the currently playing play head in the first media stream. Further, the method can associate the identified switching time offset 47 with the selected key frame.

At snap shot in time 700"+, the portion of the first media stream 50" that has been already played by media player 40 is represented diagrammatically by a forward-slash band preceding the playback time offset 43". The content publishing window 41" displays to a user of client computer 12 the contents of the first media stream corresponding to the playback time offset 43". Note that in this example, the playback time offset 43" is after the specified switching time offset 45. However, a new switching point 47 has been identified upon the receipt of a portion of the second media stream 64". A buffered portion of the first media stream 62" is represented diagrammatically by a forward-slash band succeeding the playback time offset 43", but preceding the identified switching time offset 47. Another portion of the first media stream 72" represented diagrammatically by a forward-slash band succeeding the identified switching time offset 47 is discarded by the client computer 12. The discarded portion of the first media stream 72" has been replaced in the buffer by a portion of the received second media stream 64". The portion of second media stream 64" that has been buffered (but not yet switched and played) by the media player 40 is represented diagrammatically by a reverse-slash band succeeding the identified switching time offset 47. In this case however, when the requested second media stream is received by the client computer 12 after the buffered content of the first media stream 62" is played beyond the specified switching time offset 45, an early portion of the received second media stream 74" is discarded by the client computer 12. The discarded portion of the second media stream 74" is represented diagrammatically by a reverse-slash band succeeding the specified switching time offset 45, but preceding the identified switching time offset 47.

Also at snap shot in time 700"+, the media streaming server computer 22 is streaming the second media stream 84" to the client computer 12 via the communication channel 30. The portion of the second media stream 84" (that has not been requested for streaming) preceding the switching time offset 85, and the other portion of the second media stream 84" (that remains to be streamed by media streaming server computer 22 to the client computer 12) succeeding the streaming time offset 87" are represented diagrammatically by reverse-slash bands. The streaming of the second media stream 84" by the media streaming server computer 22 to the client computer 12 is represented diagrammatically by the arrowed-curve starting at the streaming time offset 87" of the second media stream 84", and ending at the back of the buffered content 64" stored by the media player 40 at client computer 12. The discarded portion of the second media stream 74" and the buffered portion of the second media stream 64" add up to the portion of the second media stream 84" (that has been already streamed by the media streaming server computer 22 to the client computer 12 and is located) between the switching time offset 85 and the streaming time offset 87". Also note that by the snap shot in time 700"+, no other portions of the first media stream 82 have been streamed by the media streaming server computer 22 to the client computer 12.

Figure 3:
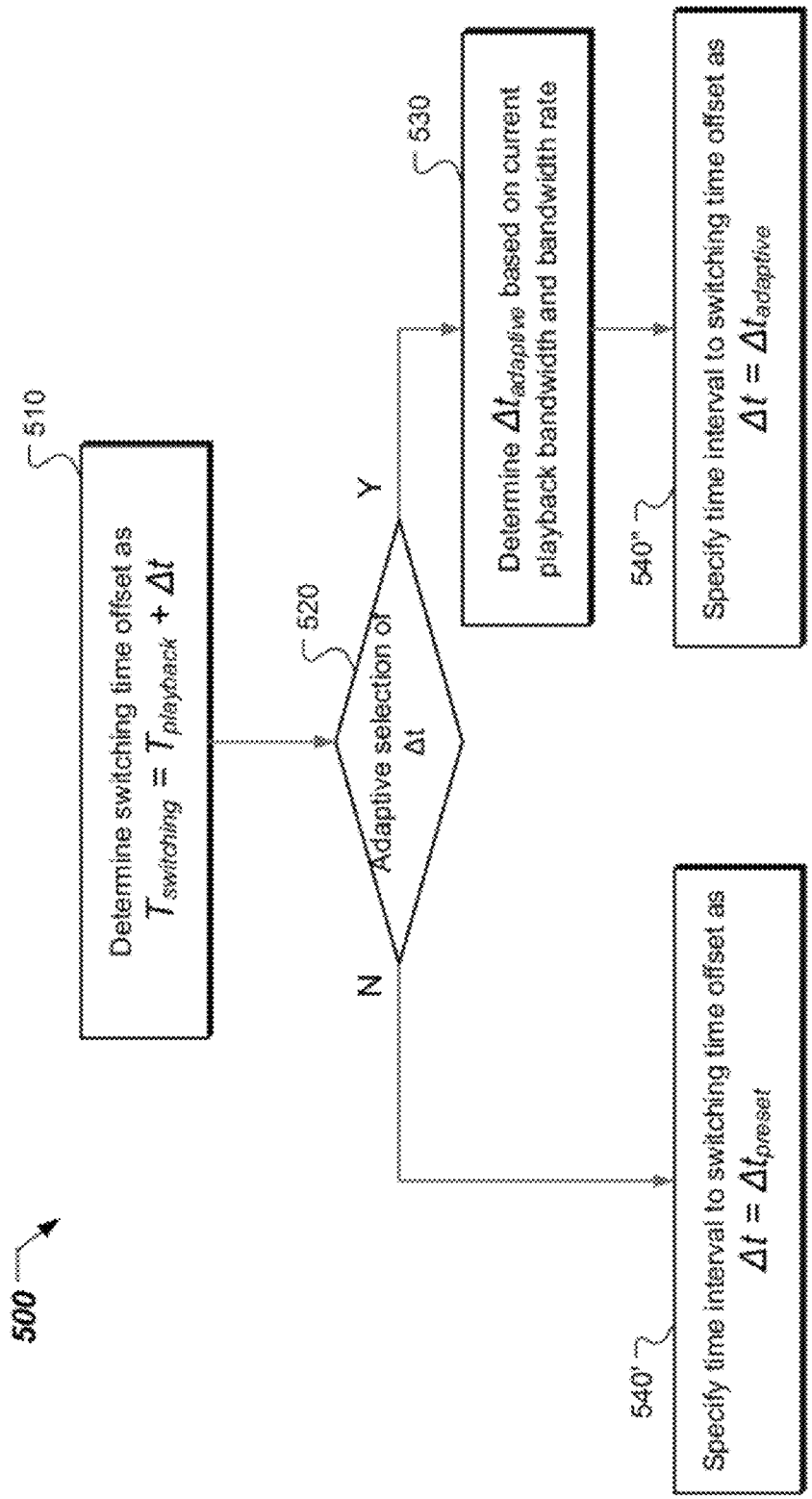
FIG. 3 shows a flow chart of an example method for specifying a switching time offset for fast switching between a first and second media streams.

FIG. 3 shows a flow chart of an example method 500 for specifying a switching time offset for fast switching between a first and second media streams. Method 500 can be combined, for example, with the method implemented in the example system 100 and described above in connection with FIG. 1. In such combination, method 500 may be used to specify the switching time offset prior to receiving 550 the instruction to switch between the first and second media streams.

The switching time offset can be specified in various ways. For instance, method 500 can determine 510 the switching time offset as a playback time offset of the first media stream plus a selected time interval. The playback time offset corresponds to the currently playing play head in the first media stream. In some implementations, the time interval can be predetermined. In other implementations, the time interval can be determined adaptively. However, the client computer 10 can be configured to verify 520 whether to select the time interval from the playback time offset to the switching time offset adaptively or whether to use a predetermined value. For example, the client computer 10 can be configured to use a predetermined value for the time interval when the switching instruction is received from a user viewing the playback of the first media stream. Otherwise, the client computer can be configured to adaptively select the time interval when the switching instruction is received from a module of the media player in response to detecting a change in the available playback bandwidth In some implementations, the time interval can be selected 540' to be a predetermined fraction of a time offset range of the buffer. For example, if the length of media content stored in the buffer is 100 seconds, then the predetermined fraction can be 3%. Therefore, the switching time offset can be specified 540' to be 3 seconds from the playback time offset. In some implementations, if the length of media content stored in the buffer is more than a predetermined time interval (e.g., 3 seconds), then the predetermined switching time offset can be specified 540' to be the playback time offset plus the predetermined time interval.

In other implementations, the time interval can be determined 530 adaptively. Once again the time interval can represent a fraction of a time offset range of the buffer. The fraction can be determined based at least in part on (i) a change rate of a client's playback bandwidth, and (ii) a magnitude of the client's playback bandwidth. As indicated above, the client's playback bandwidth can include CPU resources that are available to a media player of the client computer (for rendering media of a given bit-rate and resolution), and a transmission bandwidth of a communication channel between the media streaming server computer and the client computer. A few example situations are described below:

Example 1

If the CPU resources available to the client computer 10 become low (and the player drops frames of a first video stream), while the transmission bandwidth of the communication channel between the media streaming server and the client remains high, then a short time interval from the playback time offset to the switching time offset may be specified so that no further drops are experienced. The high transmission bandwidth of the communication channel also allows the media streaming server 20 to quickly start the streaming of the second video stream and to stream a large portion of the second video stream to the player's buffer on the client computer 10.

Example 2

The CPU resources available to the client computer 10 remain high (and the player experiences no dropped frames of a first video stream), but the transmission bandwidth of the communication channel between the media streaming server and the client changes. In an instance when the transmission bandwidth of the communication channel increases, a short time interval from the playback time offset to the switching time offset may be specified so that the player can quickly switch to a second video stream of a better quality. In another instance when the transmission bandwidth of the communication channel decreases, the media streaming server can quickly switch from streaming the first video stream encoded at a high bit-rate to a second video stream encoded at a lower bit-rate to better match the decreased transmission bandwidth of the communication cannel. A long time interval from the playback time offset to the switching time offset may be specified in this case. However, it may be advantageous to choose the switching time far from the end of the buffer to ensure that enough data can be stored in the buffer after the switching time offset to prevent risk of buffer under-runs. Moreover, it may be advantageous to choose the switching time far from the playback time offset to prolong playback of the higher quality first video stream.

Numerous other adaptive algorithms to calculate the length of the time interval from the playback time offset to the desired switching time offset can be used. In some implementations, some such adaptive algorithms can select the adaptive time interval based on a running average of recently specified switching time offsets. Once the time interval is determined based on method step 530, the client computer 10 can specify 540" the time interval from the playback offset time to the switching time as the determined adaptive time interval.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations of the subject matter have been described. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Other implementations are within the scope of the following claims.

In some implementations, the client computer 10 can be configured to request from the media streaming server computer 20 the second media stream starting from the current playback time offset. Therefore, the client computer 10 may receive from the media streaming server computer 20 both the first and second media streams in parallel. The client computer 10 may be configured to determine the switching time offset. Further, the client computer 10 can be configured to discard the first media stream and to add the content of the second stream to the end of a buffer.

What is claimed is:

1. A method implemented at a client computer that communicates with a media streaming server, the method comprising:
   receiving a first media stream from the media streaming server;
   storing the first media stream in a single buffer;
   playing buffered content of the first media stream from the single buffer;
   requesting, from the media streaming server, a switch from the first media stream to a second media stream at a specified switching time offset of the first media stream, the switching time offset corresponding to the buffered content of the first media stream being stored in the single buffer at a time of the requesting the switch;
   receiving the second media stream from the media streaming server in response to the request and before the buffered content of the first media stream is fully played, wherein initially received content of the second media stream corresponds to the buffered content of the first media stream;
   if the second media stream is received before playing of the buffered content of the first media stream has reached the specified switching time offset,
       replacing, in the single buffer, a portion of un-played buffered content of the first media stream starting at the specified switching time offset with a portion of the received second media stream,
       playing un-replaced buffered content of the first media stream from the single buffer, and
       playing, after said playing the un-replaced buffered content of the first media stream, buffered content of the second media stream from the single buffer starting at the specified switching time offset; and
   if the second media stream is received after playing of the buffered content of the first media stream has passed beyond the specified switching time offset,
       identifying a time offset corresponding to buffered content of the first media stream that is in the single buffer upon receipt of the second media stream,
       replacing, in the single buffer, a portion of un-played buffered content of the first media stream starting at the identified time offset with a portion of the received second media stream,
       playing un-replaced buffered content of the first media stream from the single buffer, and
       playing, after said playing the un-replaced buffered content of the first media stream, buffered content of the second media stream from the single buffer starting at the identified time offset.

2. The method of claim 1, wherein
the first and second media streams are video streams, and
when the second media stream is received after playing of the buffered content of the first media stream has passed beyond the specified switching time offset, the identifying of the time offset comprises selecting a first key frame of the second media stream that is after a current playback time offset of the first media stream, such that the identified time offset is a time offset of the selected key frame.

3. The method of claim 1, wherein
the first and second media streams are video streams, and
when the second media stream is received before playing of the buffered content of the first media stream has reached the specified switching time offset, and if the specified switching time offset is different than a key frame of the second media stream, said playing the buffered content of the second media stream starts at a key frame of the second media stream near the specified switching time offset.

4. The method of claim 1, wherein
said requesting the switch from the first media stream to the second media stream is performed in response to detecting a change in the client computer's playback bandwidth, and the client computer's playback bandwidth comprises computing resources that are available to a media player of the client computer for rendering media of a given bit-rate and resolution, and a transmission bandwidth of a communication channel between the media streaming server and the client computer.

5. The method of claim 1, further comprising:

specifying the switching time offset as a playback time offset of the first media stream plus a selected time interval; and selecting the time interval to be a predetermined fraction of a time offset range of the single buffer.

6. The method of claim 1, further comprising:

specifying the switching time offset as a playback time offset of the first media stream plus a selected time interval; and selecting the time interval to be a fraction of a time offset range of the single buffer, the fraction being determined based at least in part on (i) a change rate the client computer's playback bandwidth, and (ii) a magnitude of the client computer's playback bandwidth.

7. A system comprising:

a client computer; and a media streaming server computer in communication with the client computer, wherein the client computer is configured to perform first operations comprising:

storing, in a single buffer of the client computer, a first media stream streamed by the media streaming server computer;

playing buffered content of the first media stream from the single buffer;

specifying a switching time offset corresponding to content of the first media stream that is buffered in the single buffer of the client computer; and requesting, from the media streaming server computer, a switch between the first media stream and a second media stream at the specified switching time offset, wherein the media streaming server computer comprises:

a memory device that stores the first and second media streams having common time offsets, wherein corresponding first and second contents of the first and second media streams, respectively, correspond to a common time offset; and a data processor configured to perform second operations comprising streaming the first media stream to the client computer, while streaming the first media stream to the client computer, receiving a message from the client computer requesting to switch between the first and second media streams at the specified switching time offset, wherein the specified switching time offset corresponds to previously streamed content of the first media stream; and streaming to the client computer the second media stream, wherein initially streamed content of the second media stream corresponds to the previously streamed content of the first media stream, wherein the client computer is further configured to perform first operations comprising:

receiving the second media stream from the media streaming server computer before the buffered content of the first media stream is fully played;

if the second media stream is received at the client computer before playing of the buffered content of the first media stream has reached the specified switching time offset, replacing, in the single buffer, a portion of un-played buffered content of the first media stream starting at the specified switching time offset with a portion of the received second media stream, playing un-replaced buffered content of the first media stream from the single buffer, and playing, after the first operation of playing the un-replaced buffered content of the first media stream, buffered content of the second media stream from the single buffer starting at the specified switching time offset; and if the second media stream is received at the client computer after playing of the buffered content of the first media stream has passed beyond the specified switching time offset, identifying a time offset corresponding to buffered content of the first media stream that is in the single buffer upon receipt of the second media stream, replacing, in the single buffer, a portion of un-played buffered content of the first media stream starting at the identified time offset with a portion of the received second media stream, playing un-replaced buffered content of the first media stream from the single buffer, and playing, after the first operation of playing the un-replaced buffered content of the first media stream, buffered content of the second media stream from the single buffer starting at the identified time offset.

8. The system of claim 7, wherein the second operations comprise switching between the first and second media streams at a key frame of the second media stream following the specified switching time offset.

9. The system of claim 8, wherein when the second media stream is received at the client computer before playing of the buffered content of the first media stream has reached the specified switching time offset, the first operation of playing the buffered content of the second media stream starts at the key frame of the second media stream after the specified switching time offset.

10. The system of claim 7, wherein the corresponding first and second contents of the first and second media streams, respectively, include identical video scenes encoded at a first bit-rate and a second bit-rate, respectively.

11. The system of claim 7, wherein the corresponding first and second contents of the first and second media streams, respectively, are different aspects of related media.

12. The system of claim 11, wherein the corresponding first and second contents of the first and second media streams, respectively, are first view and second view videos, respectively.

13. The system of claim 7, wherein the second operations comprise obtaining the first and second media streams during a recording of a live event prior to storing the obtained first and second media streams on the memory device.

14. The system of claim 7, wherein when the second media stream is received at the client computer after playing of the buffered content of the first media stream has passed beyond the specified switching time offset, the first operation of identifying the time offset comprises selecting a first key frame of the second media stream that is after a current playback time offset of the first media stream, such that the identified time offset is a time offset of the selected key frame.

15. A non-transitory computer storage medium encoded with instructions that when executed by data processing apparatus cause the data processing apparatus to perform operations comprising:
- receiving a second video stream in response to a request that a media player switch from playing a first video stream to playing the second video stream at a specified switching time offset of the first video stream, the specified switching time offset corresponding to buffered content of the first video stream stored in a single buffer of the media player at a time of the request, wherein the second video stream is received before the buffered content of the first video stream is fully played, such that initially received content of the second video stream corresponds to buffered content of the first video stream succeeding the specified switching time offset;
- if the second video stream is received before playing by the media player of the buffered content of the first video stream has reached the specified switching time offset,
  - replacing, in the single buffer of the media player, a portion of un-played buffered content of the first video stream starting at the specified switching time offset with a portion of the received second video stream, such that the media player plays, after playing un-replaced buffered content of the first video stream from the single buffer of the media player, buffered content of the second video stream from the single buffer of the media player starting at a key frame of the second video stream located at or near the specified switching time offset; and
- if the second video stream is received after playing by the media player of the buffered content of the first video stream has passed beyond the specified switching time offset,
  - identifying a time offset corresponding to buffered content of the first video stream that is in the single buffer of the media player upon receipt of the second video stream, such that the identified time offset is associated with a key frame of the second video stream that is after a current playback time offset of the first video stream, and
  - replacing, in the single buffer, a portion of un-played buffered content of the first video stream starting at the identified time offset with a portion of the received second video stream, such that the media player plays, after playing un-replaced buffered content of the first video stream, buffered content of the second video stream from the single buffer of the media player starting at the key frame of the second video stream to which the identified time offset is associated.

16. The non-transitory computer storage medium of claim 15, wherein the operations comprise
- specifying the switching time offset as a playback time offset of the first video stream plus a selected time interval; and
- selecting the time interval to be a predetermined fraction of a time offset range of the single buffer of the media player.

17. The non-transitory computer storage medium of claim 15, wherein the operations comprise:
- specifying the switching time offset as a playback time offset of the first video stream plus a selected time interval; and
- selecting the time interval to be a fraction of a time offset range of the single buffer of the media player, the fraction being determined based at least in part on (i) a change rate of a client's playback bandwidth, and (ii) a magnitude of the client's playback bandwidth, wherein the client's playback bandwidth comprises computing resources that are available to the media player of a client computer for rendering media of a given bit-rate and resolution, and a transmission bandwidth of a communication channel between a media streaming server computer and the client computer.

* * * * *

UNITED STATES PATENT AND TRADEMARK OFFICE
CERTIFICATE OF CORRECTION

PATENT NO.         : 8,321,905 B1
APPLICATION NO.    : 12/572962
DATED              : November 27, 2012
INVENTOR(S)        : Kevin Streeter, Stephen Cheng and Abhinav Kapoor Page 1 of 1

It is certified that error appears in the above-identified patent and that said Letters Patent is hereby corrected as shown below:

Column 17, line 20, delete "rate the" and insert -- rate of the -- therefor.

Signed and Sealed this
Fifth Day of March, 2013

Teresa Stanek Rea
*Acting Director of the United States Patent and Trademark Office*